3,734,956
PROCESS FOR THE PREPARATION OF DIPHENIC ACID AND 2-PHENYL BENZOIC ACID
John Martin Nilsson, Solna, and Jadwiga Palicka, Lidingo, Sweden, assignors to Aktiebolaget Bofors, Bofors, Sweden
No Drawing. Filed Mar. 28, 1972, Ser. No. 238,981
Int. Cl. C07c 63/00
U.S. Cl. 260—515 P                    2 Claims

ABSTRACT OF THE DISCLOSURE

Diphenic acid and 2-phenyl benzoic acid may be prepared according to the invention by heating copper (I)-phthalate in a solvent, such as quinoline, at a temperature of 110–200° C.

BACKGROUND

Diphenic acid and 2-phenyl benzoic acid are of very great interest. Diphenic acid may be used for the preparation of i.a. certain polymers of the type polyesters, polyamides, softening agents for polyvinyl chloride, lubricants and as a starting material for syntheses of drugs. 2-phenyl benzoic acid may be used as a starting material for the preparation of softening agents and drugs.

Present technical methods for the preparation of diphenic acid are primarily based on phenanthrene that may be oxidized e.g. by ozone, under cleavage of the 9,10-bond. The most usual preparation of 2-phenyl benzoic acid is based on the reaction of fluorenone with melt KOH. These methods are difficult and expensive to carry out and are moreover based on starting material obtained from coal tar which is no longer produced in many countries.

THE PRESENT INVENTION

According to the present invention we have found that these compounds may be prepared in a simple and economic way by a process based on the easily available starting material phthalic acid. The process according to the invention is substantially characterized by heating copper (I)-phthalate in a solvent, such as quinoline, at a temperature of 110 to 200° C., whereupon the acids, obtained in the form of their copper (I)-salts, are separated from the reaction mixture and the free acids are recovered.

The relation diphenic acid: 2-phenyl benzoic acid in the reaction mixture is adjusted substantially by means of the reaction temperature so that higher temperature will give a higher content of 2-phenyl benzoic acid.

The solvent may be quinoline or pyridine or an alkyl pyridine and the copper (I)-phthalate may be either dissolved or suspended in the solvent.

The temperature is preferably kept at 120–160° C.

The reaction may be schematically illustrated in the following way:

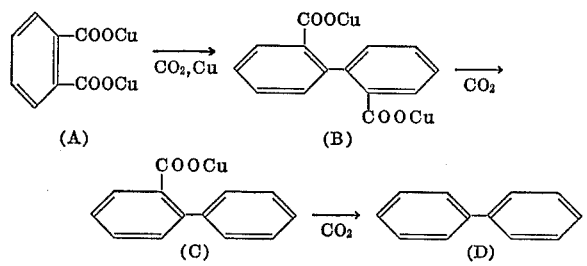

Copper (I)-phthalate (A) will split off carbon dioxide and metallic copper to the formation of copper (I)-diphenate (B) which may split off more carbon dioxide to the formation of copper (I)-phenyl benzoate (C). This may very slowly be decarboxylated to the formation of biphenyl (D). The main by-product from these reactions is benzoic acid. The starting material copper (I)-phthalate may easily be obtained from phthalic acid and copper (I)-oxide or from phthalic anhydride and copper (I)-oxide.

EXAMPLES

The following examples are illustrative of some embodiments of the present invention. It should be understood that these examples are not intended to limit the invention and obvious changes may be made by those skilled in the art without changing the essential characteristics and the basic concept of the invention.

EXAMPLE 1

Copper (I)-phthalate is prepared by boiling at 135–140° C. of equimolar amounts of phthalic acid and copper (I)-oxide in xylene for about 20 hours with continuous removal of water from the azeotrope as formed. The copper (I)-phthalate as obtained is filtered off and dried.

Copper (I)-phthalate (0.01 mole) in 12.5 ml. of quinoline is heated to 120° C. under stirring during 280 minutes at which 0.01 mole of carbon dioxide are evolved.

The reaction mixture is then allowed to cool and is diluted with 200 ml. of ether. The mixture is treated with 200 ml. of 2 M sodium hydroxide solution and is filtered. Both the solid phase containing copper (I)-salts of the acids formed and alkaline aqueous solution are treated with 200 ml. of 2 M hydrochloric acid and the acids are separated by extraction with 300 ml. of ether. The acids are then methylated with diazomethane in ether/methanol. The ester mixture as obtained is separated by chromatography on silica gel columns with 20% toluene in petroleum ether (boiling point 40–60° C.) and then with 20% toluene and 20% diisopropyl ether in petroleum ether as eluents. The isolated esters are identified by means of IR spectra, mass spectra and melting point; dimethyl diphenate M.P. 72–73° C. The esters are thereafter hydrolyzed to the free acids: 2-phenyl benzoic acid having a melting point of 112–113° C. (yield 0.28 g., 28%) and diphenic acid having a melting point of 227–228° C. (yield 0.35 g., 28%). The mixture of acids may also be separated directly by stepwise leaching and recrystallization. In order to leach out any benzoic acid that may have been formed the mixture is washed with water and at about 30° C. From the remaining mixture of unreacted phthalic acid, 2-phenyl benzoic acid and diphenic acid, the phthalic acid is washed out with hot water and then the 2-phenyl benzoic acid with methylene chloride. The acids are identified by means of melting points and IR spectra.

EXAMPLE 2

Copper (I)-phthalate (0.01 mole) in 25 ml. of quinoline is kept at 130° C. under stirring for 200 minutes at which 0.01 mole of carbon dioxide are evolved. After a treatment analogous to that of Example 1 a yield of 50% of 2-phenyl benzoic acid and a yield of 35% of diphenic acid is recovered. No unreacted phthalic acid remains and only small amounts of benzoic acid (5%) have been formed.

EXAMPLE 3

Copper (I)-phthalate (0.01 mole) is heated in 25 ml. of quinoline for 160 minutes at 160° C. under vigorous stirring and 0.01 mole of carbon dioxide are evolved. After the same treatment as in Example 1 small amounts (5%) of diphenic acid and a yield of 60% of 2-phenyl benzoic are recovered. As byproducts about 10% of benzoic acid and about 10% of biphenyl are obtained.

What is claimed is:

1. A process for the preparation of diphenic acid and 2-phenyl benzoic acid comprising heating of copper (I)-phthalate at a temperature of 110–200° C. in a solvent selected from quinoline, pyridine and an alkyl pyridine; and separating the acids, obtained in the form of their copper (I)-salts, from the reaction mixture, and finally recovering the free acids.

2. A process according to claim 1 in which the temperature is kept at 120 to 160° C.

References Cited

UNITED STATES PATENTS 2,766,294  10/1956  Toland _____ 260—619

OTHER REFERENCES

Riley: Chemical Abstracts, vol. 23 (1929), p. 4159.

JAMES A. PATTEN, Primary Examiner

U.S. Cl. X.R.

260—438.1, 469, 475 R, 515 R, 670